F. L. MORSE.
SHAFT COUPLING.
APPLICATION FILED FEB. 2, 1915.
1,244,533.
Patented Oct. 30, 1917.
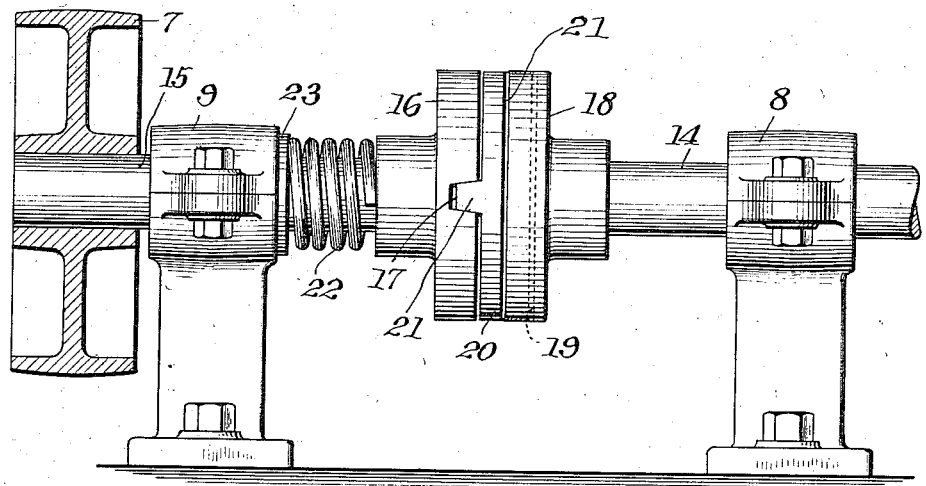
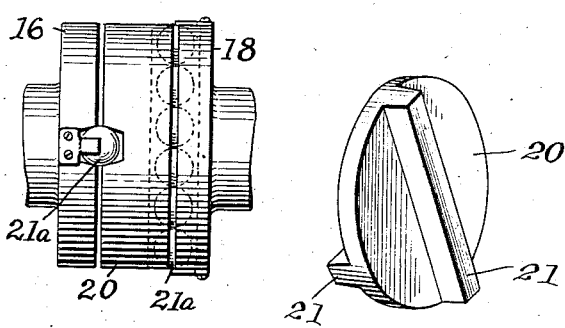
WITNESSES
INVENTOR
Frank L. Morse.
BY
Edward A. Wright,
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SHAFT-COUPLING.

1,244,533.  Specification of Letters Patent.  Patented Oct. 30, 1917.

Application filed February 2, 1915. Serial No. 5,637.

*To all whom it may concern:*

Be it known that I, FRANK L. MORSE, a citizen of the United States, residing at Ithaca, in the county of Tompkins and State of New York, have invented a certain new and useful Improvement in Shaft-Couplings, of which improvement the following is a specification.

This invention relates to flexible shaft couplings, and particularly to that form known as the "Oldham" coupling, in which both sections of the shaft are provided with coupling heads having diametrical grooves, and between which is located an intermediate coupling disk having corresponding diametrical projections upon its opposite faces for engaging said grooves, the object being to provide means for automatically taking up the wear between the coupling members, whereby all objectionable noise and looseness of the parts will be eliminated, and the coupling will continue to operate silently and efficiently for an indefinite time.

With this object in view, my improvement comprises the coupling heads connected to the respective shaft sections, and the intermediate coupling member, said parts having one or more transverse grooves of tapered cross section, and correspondingly tapered elements engaging said grooves, with means for automatically forcing the parts together.

In the accompanying drawings: Figure 1 is a side elevation of a coupling embodying my improvement; Fig. 2, a perspective view of the intermediate coupling disk; and Fig. 3, an elevation showing a modified form of coupling.

According to the construction shown in Fig. 1, one section of the shaft, 14, is provided with the coupling head, 18, having a transverse groove, 19, located diametrically across the face of the head, while the other section, 15, is provided with coupling head, 16, having the transverse groove, 17. The sections of the shaft may be mounted in suitable bearings, such as 8 and 9. Between the coupling heads, 16 and 18, is placed the intermediate coupling disk, 20, having transverse projections, 21, extending diametrically across the opposite faces of the disk and engaging within the grooves, 17 and 19, of the coupling heads.

According to my improvement, the grooves and projections are tapered in cross section, so that as the parts wear, the projections may engage deeper within the grooves and the parts of the coupling may thus be kept tight at all times. Any suitable means may be employed for forcing said parts together for taking up the wear, but I have shown a spring, 22, acting between the head, 16, and a ring, 23, bearing against the block, 9. The shaft, 15, is slidably mounted in its bearing block, 9, and carries a pulley or gear wheel, 7, by which the power may be transmitted to or from another wheel.

The shaft sections, 14 and 15, may not be in line with each other, but when one is turned it operates through the coupling heads and intermediate disk to transmit rotation to the other, the disk member having also a slight lateral movement between the coupling heads on account of the shafts being out of alinement. There is a clearance between the face of the shaft coupling member or head and the face of the intermediate coupling disk, and also between the projections and the bottom of the grooves, which allows for the automatic adjustment of the parts under the action of the spring when wear occurs between the projections and the walls of the grooves. With this improved construction it will be seen that the parts of the coupling will be forced tightly together at all times so that all noise due to looseness of the parts will be avoided, and the coupling will operate efficiently and silently.

The transverse grooves may be formed in the faces of the coupling heads or in the faces of the intermediate coupling member or in both, as indicated in Fig. 3 of the drawing, and the projections or elements engaging within the grooves may be separate from the heads or intermediate disk, and in this modification are shown in the form of balls, 21ª, adapted to move laterally in the grooves.

It will also be evident that the intermediate coupling member or disk, 20, may be constructed either with or without the tapered grooves, and that the correspondingly tapered elements which engage within the grooves and transmit rotary movement between the coupling members, may be formed either integral with the intermediate coupling disk or with the outside coupling members or may be formed separate from the coupling members, as desired.

Having now described my invention, what I claim as new and desire to secure by Letters Patent is:

1. The combination of a shaft having a coupling member fixed thereon, another rotatable coupling member, and an intermediate coupling member located between the other coupling members, some of said coupling members being provided with transverse grooves tapered in cross section, correspondingly tapered elements coöperating therewith, and means acting to force said tapered portions together for taking up wear.

2. The combination with outside rotary coupling members, of an intermediate rotary coupling member located between said outside members, transverse grooves of tapered cross section being formed between the adjacent faces of said members, correspondingly tapered elements engaging within said grooves for transmitting rotary movement between said coupling members, and a spring acting to force said tapered portions together for taking up wear.

3. The combination of a shaft, a coupling member fixed thereon and having a transverse groove tapered in cross section, another rotatable coupling member also having a similar transverse groove, an intermediate coupling member provided with correspondingly tapered projections upon its opposite sides for coöperating with said grooves, and a spring for forcing said coupling members together.

4. The combination of a wheel and rigidly connected coupling head mounted to rotate and slidable longitudinally upon its bearing, said coupling head having a transverse groove tapered in cross section, a shaft having another coupling head fixed thereon and provided with a transverse groove tapered in cross section, an intermediate coupling disk having tapered projections upon its opposite sides for engaging said grooves, and means acting to force the longitudinally movable head against the coupling disk.

5. The combination of a shaft having a wheel and a coupling head fixed thereon, a bearing in which said shaft is rotatably and slidably mounted, said coupling head having a transverse groove tapered in cross section, another shaft having a coupling head provided with a transverse groove tapered in cross section, an intermediate coupling disk having tapered projections upon its opposite sides for engaging said grooves, and a spring acting to force said longitudinally movable shaft and head against the intermediate coupling disk.

FRANK L. MORSE.

Witnesses:
C. C. NICHOLS,
W. E. MEADWELL.